(12) United States Patent
Shigaki

(10) Patent No.: US 6,996,040 B2
(45) Date of Patent: Feb. 7, 2006

(54) PSEUDO MULTI-CHANNEL PLAY-BACK APPARATUS

(75) Inventor: Satomi Shigaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/895,046

(22) Filed: Jul. 21, 2004

(65) Prior Publication Data

US 2004/0258247 A1  Dec. 23, 2004

Related U.S. Application Data

(63) Continuation of application No. 09/210,752, filed on Dec. 15, 1998, now Pat. No. 6,781,933.

(30) Foreign Application Priority Data

Dec. 15, 1997 (JP) .................................. 9-362502

(51) Int. Cl.
*G11B 5/09* (2006.01)

(52) U.S. Cl. ...................... 369/47.1; 369/59.1; 369/87; 369/89

(58) Field of Classification Search .................... None
See application file for complete search history.

(56) References Cited

U.S. PATENT DOCUMENTS

| 5,587,978 A | 12/1996 | Endo et al. |
| 5,635,930 A | 6/1997 | Oikawa |
| 5,870,480 A | 2/1999 | Griesinger |

FOREIGN PATENT DOCUMENTS

| JP | 2-261213 | 10/1990 |
| JP | 9-259539 | 10/1997 |

*Primary Examiner*—Muhammad Edun
(74) *Attorney, Agent, or Firm*—Foley & Lardner LLP

(57) ABSTRACT

Compressed audio data for 5.1 channels stored in the DVD-ROM 11A is read by the AC-3 decoder 12 of a pseudo multi-channel stereo play-back apparatus and, after expansion, stored temporarily in a buffer 13, channel by channel. Among stored audio data stored in the buffer 13, audio data for left and right channels and for a front center channel are then subjected to the phase transformation. Audio data for left and right front channels are mixed with the phase transformed audio data by first and second mixing circuits 21 and 22 and mixed audio data are converted into analog audio signals by first and second D/A converters. The apparatus is capable of pseudo reproduction of the multi-channel audio signals stored in a recording medium such as a DVD-ROM by two channel play-back with an excellent sound effect which is not obtainable by usual two-channel play-back systems.

4 Claims, 4 Drawing Sheets

PSEUDO MULTI-CHANNEL PLAY-BACK APPARATUS

CROSS-REFERENCE TO RELATED PATENT APPLICATIONS

This application is a continuation of application Ser. No. 09/210,752, filed Dec. 15, 1998, now U.S. Pat. No. 6,781,933, and based on Japanese Patent Application No. 9-362502, filed Dec. 15, 1997, by Satomi Shigaki. This application claims only subject matter disclosed in the parent application and therefore presents no new matter.

BACKGROUND OF THE INEVENTION

1. Field of the Invention

This invention relates to a two channel pseudo play-back apparatus for pseudo reproduction of a multi-channel audio output, and particularly relates to a two channel pseudo play-back apparatus in a personal computer for pseudo reproduction by two channel speakers of multiple channel audio outputs from, for example, DVD-ROMs.

2. Background Art

Conventionally, in a personal computer loaded with a reproducible sound board of sound or music, it was standard to use two channels for outputting an audio output of the medium for playing back.

Examples of reproducible mediums of sound or music in a personal computer include CD-ROM or CD-I (Compact Disc-Interactive). In the play-back of CD-I, there is a system which is capable of obtaining particular sound effect by processing audio signals for right and left channels, as disclosed in Japanese Patent Application, First Publication No. Hei 2-261213. This apparatus is provided with a function for producing particular sound effects using a four-channel mixing circuit and this apparatus comprises a digital audio processing portion containing a four-times over sampling type digital filter, and outputs two channel audio signals using the four channel mixing circuit by individually processing digital audio data for the L channel and the R channel.

Recently, attention has been attracted to an audio data signal system for digital video discs (hereinafter called DVD), which is a high efficiency coding system of AC-3 developed by Dolby Research Institute in the United States. This AC-3 is capable of playing back 5.1 channels of surrounding sounds. The number of channels in this AC-3 system is defined as two right and left front channels, one front center channel, two rear channels, and a low band channel (0.1 channel) for driving a super woofer.

For such audio data of 5.1 channels are reproduced by a personal computer with two audio output channels, two methods are known as described hereinafter.

A stereo play-back apparatus using the first method is described hereinafter with reference to FIG. 4. The first method comprises the steps of reading compressed digital audio data from a digital video disc-read only memory (DVD-ROM) 11 which stores the compressed audio data, and expanding the compressed data into 5.1 channel audio data by a decoder 12 of the AC-3, and storing expanded data temporarily in a buffer 13 composed of a plurality of buffers 131 to 136. Subsequently, among digital audio data stored in the buffer 13, digital audio data (FR and FL) for the left and right front channels are converted into analog audio signals by respective D/A converters constituted by a left D/A converter (L) and a right D/A converter (R), and thus converted analog signals are output into the audio signal output lines for playing back by left and right speakers 17 and 18.

A stereo play-back apparatus using the second method is described hereinafter with reference to FIG. 5. The same reference numerals are used in FIG. 5 for the same elements as those of FIG. 4, and explanations of the same elements are omitted. The stereo play-back apparatus using the second method comprises the same steps as those described referring to FIG. 4, that is, reading compressed digital audio data from the DVD-ROM, expanding the compressed data into digital signals for 5.1 channels using the AC-3 decoder 12, and storing the expanded data temporarily in the buffer 13. The steps are followed by mixing audio data for 3.1 channels containing the left front channel (FL), left rear channel (RL), the front center (FC), and a super woofer (SU) using a left mixing circuit (L) 18, converting the mixed data into analog data using a left D/A converter (L) 15, outputting the analog data into the left audio outputting line for play-back of the sound by a left speaker 19. Similarly, the audio data for 3.1 channels containing the right front channel (FR), right rear channel (RR), the front center channel (FC), and the super woofer (SU) are mixed using a right mixing circuit (R) 19, the mixed data are converted into an analog signals using a right D/A converter (R) 15, and the analog signals are output to a right outputting line for play-back using a right speaker 17.

In the first method, since audio data for only two channels consisting of the left and right channels (FL and FR) from among 5.1 channels are output, it is not expected to take advantage of the surround effect of the DVD. The second method is able to produce audio quality which is superior to that of the first method by mixing all of the audio data for the 5.1 channels. However, the surround effect of the second method is still inferior to that reproduced by the play-back apparatus for DVD.

Therefore, it is an object of the present invention to provide a pseudo stereo play-back apparatus with two channel speakers, which is capable of playing back a superior surround effect which is not obtainable using a usual two-channel play-back apparatus by processing the multiple channel audio outputs from a recording medium such as DVD-ROM for the two channel audio outputting apparatus.

Another object of the present invention is to provide a pseudo stereo play-back apparatus with two channel speakers, which is capable of playing back a superior surround effect which cannot be obtained with the usual two channel audio output apparatus by pseudo reproduction of the multiple channels by a two channel audio apparatus from a recording medium containing multiple channel audio outputs.

SUMMARY OF THE INVENTION

According to an aspect of the present invention, a pseudo multi-channel stereo play-back apparatus comprises: (a) a decoder for expanding compressed digital audio signals channels stored in a recording medium into digital audio signals for a plurality of channels; (b) a memory means for temporarily storing digital audio signals expanded by said decoder; (c) a phase control circuit for controlling phases of digital audio signals for specified channels which are a part of digital audio signals for all channels stored in said memory means; (d) first and second mixing circuits for mixing the digital audio signals after being transformed by said phase control circuit with other digital audio signals for other channels stored in said memory means; and (e) first and second A/D converters for converting respective outputs of the first and second mixing circuits into analog sound signals.

That is, this aspect of the present invention performs pseudo play-back of a surrounding sound by the steps of expanding the multi-channel digital audio signals stored in a memory, and storing the expanded signals in a memory. Subsequently, among stored signals for all channels, digital audio signals for the left and right rear channels and for the front center channel are subjected to the phase control by the phase control circuit. Further, other digital audio data for the left and right front channels are transferred to the mixing circuits as they are and after they are mixed with the first and second mixing circuits with the phase transformed signals for the rear channels and the front center channel, outputs of the first and second mixing circuits are converted by the first and second D/A converters, respectively, into analog audio signals. The analog audio signals from both converters are played back by two respective speakers located at both left and right positions. Consequently, the present apparatus performs pseudo play-back of a multi-channel surrounding sound with two speakers of a personal computer.

According to another aspect of the present invention, the pseudo multi-channel stereo play-back apparatus comprises: (a) a decoder for expanding compressed digital data stored in said memory device; (b) a memory means for temporarily storing digital data expanded by said decoder; (c) a phase control circuit for controlling phases of the digital audio signals for left and right rear channels and a phase for the front center channel among digital audio signals for all channels stored in said memory means; (d) first and second mixing circuits for mixing the phase transformed digital audio signals for left and right rear channels, digital audio signals for left and right front channels stored in said memory, and the phase transformed digital audio signal of the front center channel; and (e) first and second D/A converters for converting respective outputs of said first and second mixing circuits into analog sound signals.

The pseudo multi-channel stereo play-back apparatus of the second aspect of the present invention performs pseudo play-back of multi-channel surrounding sound by first expanding the multi-channel digital audio signals stored in a memory and storing the expanded signals in a memory. Among stored signals for all channels, digital audio signals for the left and right rear channels and for the front center channel are subjected to the phase transformation by the phase control circuit. Subsequently, the other digital audio data for the left and right front channels are transferred to the mixing circuits as they are and after they are mixed using the first and second mixing circuits with the phase transformed signals of the rear channels and the front center channel. The outputs of the first and second mixing circuits are then converted by respective first and second D/A converters into analog audio signals and these analog audio signals from both converters are played back by two speakers located at both left and right positions. Consequently, a multi-channel surrounding sound can be played back by pseudo reproduction using two speakers of the personal computer.

According to an other aspect of the present invention, the first and second mixing circuits of the pseudo multi-channel stereo play-back apparatus mixes digital audio signals for left and right front channels and left and right rear channels, giving each audio signal a space transmission characteristic which represents a play-back sound field and speaker characteristics.

In this aspect of the present invention, the first mixing circuit mixes digital audio signals for the left front and the left rear channels, giving each digital audio signal a space transmission characteristic which represents the play-back sound field and the speaker characteristics, and the second mixing circuit mixes digital audio signals for the right front and the right rear channels, giving each digital audio signal a space transmission characteristic which represents the play-back sound field and the speaker characteristics. Thereby, an audience at its position can hear a sound from both the left and right speakers with a deep and stereo feeling.

According to still an other aspect of the present invention, the digital audio signal for the front center channel, after it is subjected to the phase control processing, is output into both first and second mixing circuits.

That is, according to this aspect of the present invention, the digital audio signals for the front and rear channels are mixed with both first and second mixing circuits, so that the audio signal for the front center channel is localized in each sound and in each sound image of each left and right front and left and right rear channels to play-back by two speakers, which results in increasing the surrounding effect.

According to still an other aspect of the present invention, digital audio signals for the super woofer channel which is used for low frequency sound is directly input into both mixing circuits for mixing.

That is, digital audio signals for the super woofer channel for driving low frequency sounds are transferred and mixed in the first and second mixing circuits, which results in increasing the low frequency sound when playing back by two speakers.

According to still another aspect of the present invention, a pseudo multi-channel stereo play-back apparatus comprises: (a) a decoder for expanding compressed digital audio data stored in a memory into digital audio signals for a plurality of channels; (b) a memory means for storing digital sound data for each channel after expansion by said decoder; (c) a phase control circuit for controlling the digital audio signals for the left and right rear channels and the digital audio signals for the front center channel from among digital sound data stored in said memory means; (d) first and second mixing circuits for mixing digital audio signals for the left and right rear channels after being phase transformed, digital audio signals for the left and right front channels as stored in said memory, and digital audio signals for the front center channel after being phase transformed at respective mixing circuits; (e) first and second D/A converters for converting outputs of said first and second mixer circuits into respective analog audio signals.

That is, according to this aspect of the present invention, a pseudo multi-channel play-back apparatus performs pseudo multi-channel reproduction for playing back of a surrounding sound by first expanding the multi-channel digital audio signals stored in a memory by the decoder, and storing the expanded signals in a memory. Subsequently, among stored signals for all channels, digital audio signals for the left and right rear channels and for the front center channel are subjected to the phase control by the phase control circuit, and the remaining digital audio data for the left and right front channels are transferred as they are to the mixing circuits. After the transferred signals are mixed with the phase transformed audio signals by the first and second mixing circuits, outputs of these mixing circuits are converted by respective first and second D/A converters into analog audio signals. The analog audio signals from both converters are played back by two speakers located at both left and right positions as a pseudo reproduction of the multi-channel surrounding sound. That is, a multi-channel surrounding sound can be played back by a personal computer with two speakers.

DESCRIPTION OF PREFERRED EMBODIMENTS

The present invention will be described in detail with reference to preferred embodiments.

Figure 1:
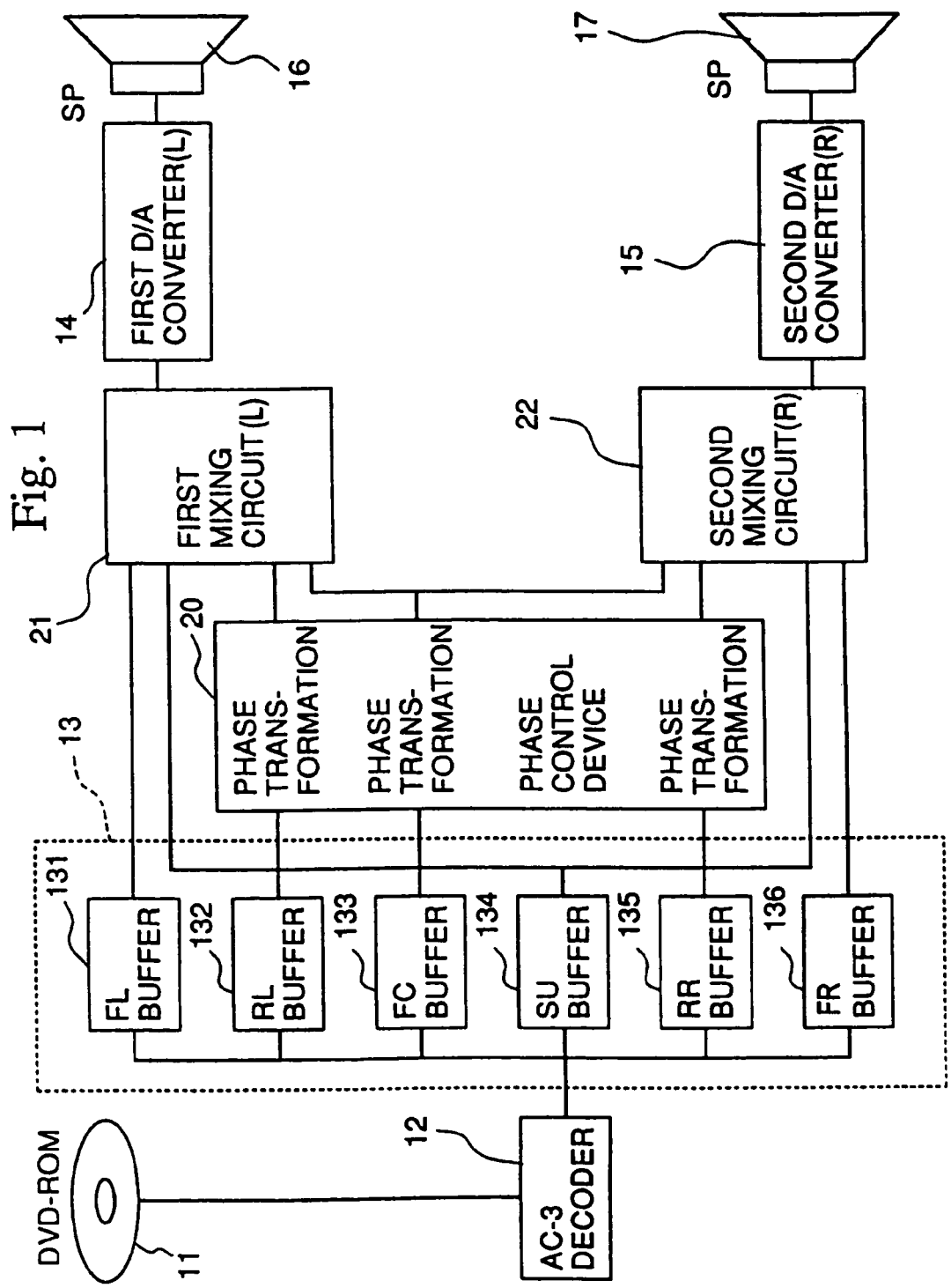
FIG. 1 is a block diagram showing a circuit construction of the pseudo multi-channel stereo play-back apparatus according an embodiment of the present invention.
Figure 4:
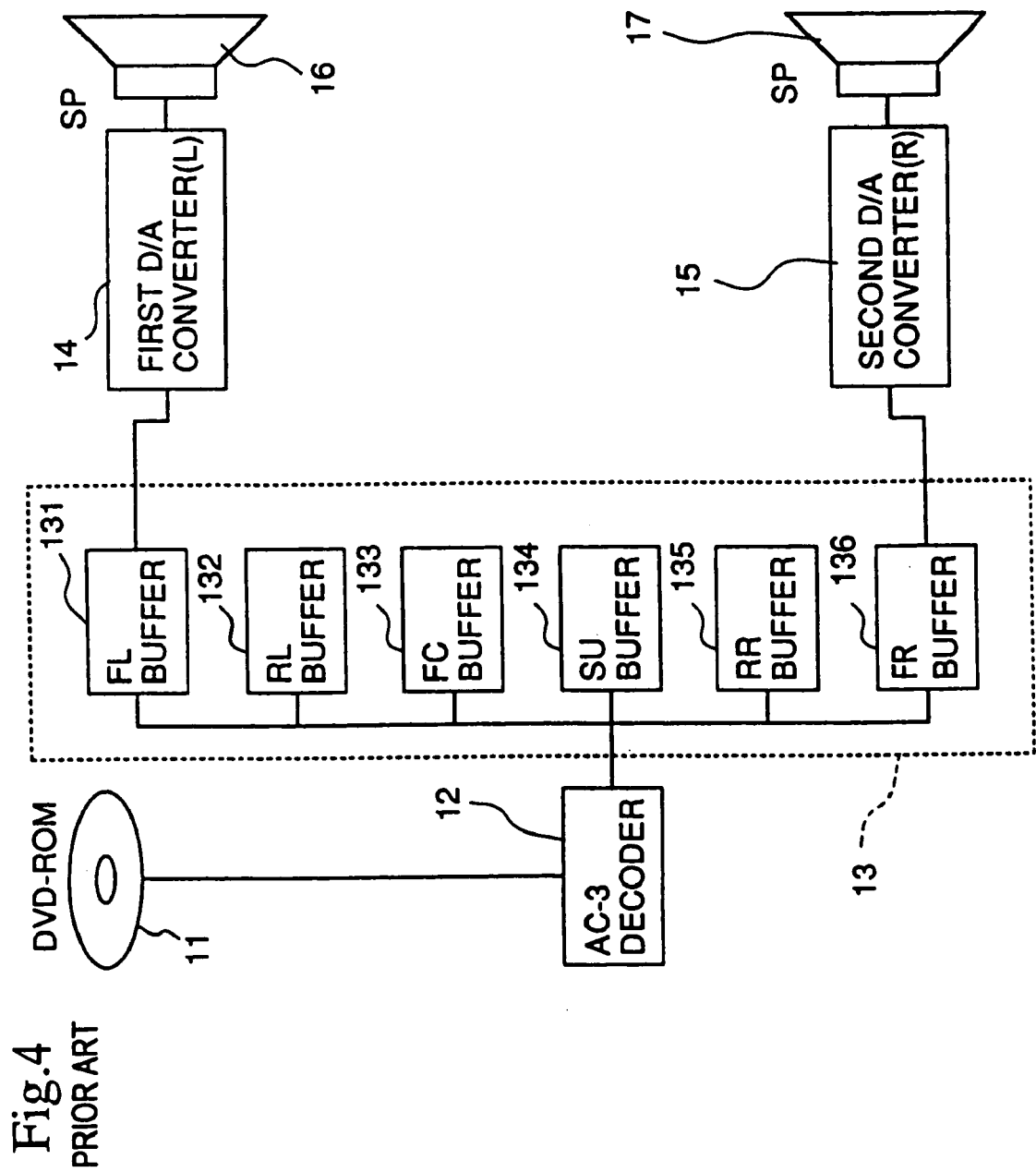
FIG. 4 is a block diagram showing a stereo play-back apparatus according to a first conventional method.
Figure 5:
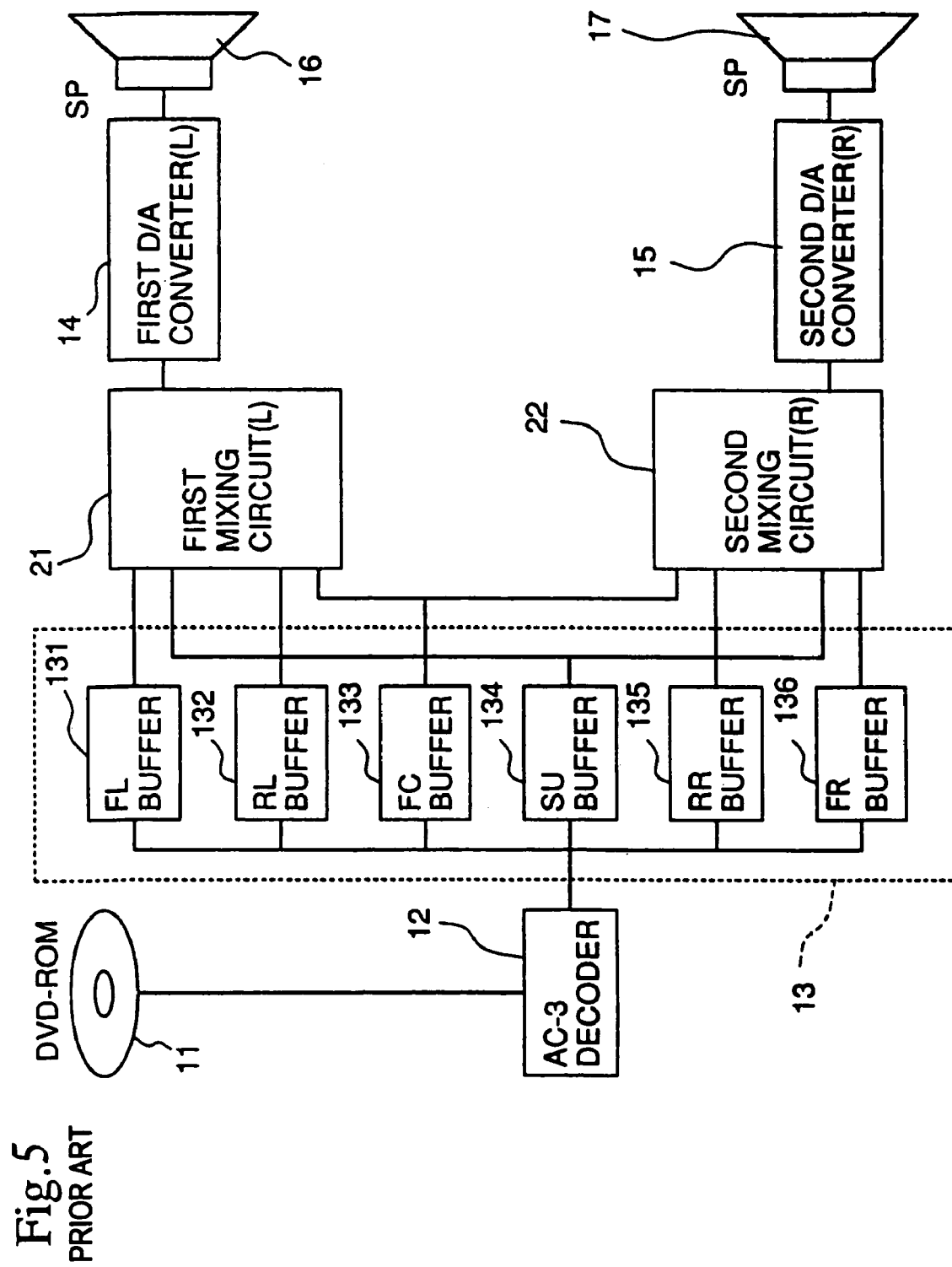
FIG. 5 is a block diagram showing a stereo play-back apparatus according to a second conventional method.

FIG. 1 is a block diagram showing a pseudo multi-channel stereo play-back apparatus according to an embodiment of the present invention. The same elements in FIG. 1 as those in FIGS. 4 and 5 are indicated by the same reference numerals and explanations thereof are omitted. In FIG. 1, audio data and image data are stored in the form of digital signals in DVD-ROM (Digital Video Disc-Read Only Memory) 11. Since the present invention does not treat the video data, explanations thereof are omitted.

An AC-3 decoder 12 incorporates compressed digital audio data for 5.1 channels among digital signals which are read out from DVD-ROM 11 and expands these compressed digital data. A buffer 13 composed of a plurality of buffer segments is used for temporarily storing the expanded data from the AC decoder channel by channel. Audio data for a left front channel FL are stored in a buffer segment 131, audio data for a left rear channel RL are stored in a buffer segment 132, audio data for a front center channel FC are stored in a buffer segment 133, and audio data for a super woofer are stored in a buffer segment 134, audio data for the right rear channel RR are stored in a buffer segment 135, and audio data for a right front channel FR are stored in a buffer segment 136, respectively. The phase control circuit 20 controls phases of the audio data stored in respective buffer segments for the left rear RL, the front center FC, and the right rear RR channels among audio data stored temporarily in the buffer 13. A first mixing circuit 22 mixes audio data for audio sound for a right side output. Similarly, the second mixing mixes audio data for a left side output. A first D/A converter converts the digital audio data mixed by the first mixing circuit into analog audio signals. Similarly, a second D/A converter converts the digital audio data mixed by the second mixing circuit into analog audio signals. Speakers at the right and the left sides 16 and 17 play-back sounds along respective output analog signals by the first and second converters.

Operations of the thus constructed pseudo multi-channel stereo play-back apparatus will be described hereinafter. Compressed audio data which are read from the DVD-ROM 11 by a light pick-up (not shown) are expanded into audio data for 5.1 channels by an AC-3 decoder 12. That is, compressed data are expanded into digital audio data for respective channels of the left front (FL), left rear (RL), front center (FC), right front (FR), right rear (RR), and the super woofer (SU). Those expanded data are stored temporarily in each buffer segment 13 channel by channel. Digital audio data for the center front channel (FC) and for two rear channels (RL and RR) are subjected to phase transformation by the phase control circuit 20 so as to obtain sound outputs at respective positions.

Since the audio data for the super woofer (SU) is monaural, it is input directly into both the first and second mixing circuits without being subjected to the phase transformation, and it is mixed with audio data of both right and left front and rear channels.

Subsequently, the phase transformed front center data (FC) is transmitted to both the first and second mixing circuits 21 and 22. The audio data of the left rear (RL) channel is transmitted to the first mixing circuit 21 and the audio data of the right rear channel (RR) is transmitted to the second mixing circuit 22, respectively. In a mixing circuit 21 at the left side, the left front (FL) data and the phase transformed left rear (RL) data are mixed. Similarly, the right front (FR) data from the buffer 13 and the phase transformed right rear (RR) data are mixed in the second mixed 22.

Next, a method of mixing is described hereinafter.

Figure 2:
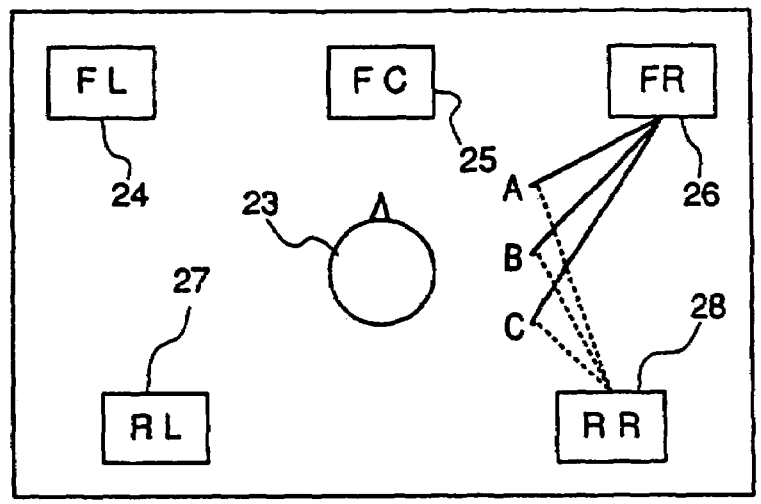
FIG. 2 is a diagram for explaining the concept of the virtual five channel audio play-back by an embodiment of the present invention.

FIG. 2 illustrates an image of virtual five channel audio play-back processing. Assume that an audience 23, sitting in front of a personal computer, is able to execute pseudo hearing by two left and right speakers a virtual sound field constructed by five channels which are composed of three channels of the left front (FL) 24, the front center (FC) 25, and the right front (FR) 26; and two channels of the left rear (RL) 27 and the right rear (RR) positions 28. The point A in FIG. 2 indicates a sound point located at the right front of the audience 23, the point B is located at a right lateral position, and the point C is located at a right rear position of the audience 23.

In order to realize pseudo play-back of 5.1 channel sound by two channel speakers, it is necessary to mix audio data not by simple addition of the front channels and the phase transformed rear channels, but to mix audio data for the front positions and the phase transformed rear positions, taking times of arrival of the audio data to respective positions of A, B and C, so as to obtain a deep stereo feeling of the sound.

At first, the mixing of audio data for the right channels is described. Assume that the audio data output from the right front channel (FR) is expressed by Fr(t), and the audio data output from the right rear (RR) channel is expressed by Rr(t). Assume that a space transmission characteristic which represents a speaker's and a play-back sound field is expressed as G(t), and times t for the audio data output from the right front speaker to arrive at points A and B and C are $t=\alpha-1$, $\alpha$, $\alpha+1$, respectively.

Similarly, assume that time t for the audio data output from the right rear position to arrive at points A, B, and C are $t=\alpha+1$, $\alpha$, $\alpha-1$, respectively.

Furthermore, assume that the audio signal to be played back at points A, B, and C are $z(t=\alpha-1, \alpha, \alpha+1)$.

The time for the data output from the right front (FR) 26 position to arrive at the point A is $t=\alpha-1$, and the time for the data output from the right rear position to arrive at the point A is $t=\alpha+1$, so that the sound signal z(t) reproduced at the point A can be expressed as;

$$z(t=\alpha-1)=G(t=\alpha-1)*Fr(t=\alpha-1)+G(t=\alpha+1)*Rr(t=\alpha+1) \quad (1)$$

Similarly, the sound signal reproduced at the point B can be expressed as, $$z(t=\alpha)=G(t=\alpha)*Fr(t=\alpha)+G(t=\alpha)*Rr(t=\alpha) \quad (2)$$

The sound signal reproduced at the point C is expressed as, $$z(t=\alpha+1)=G(t=\alpha+1)*Fr(t=\alpha+1)+G(t=\alpha-1)*Rr(t=\alpha-1) \quad (3)$$

These equations are summarized as shown below.

$$z(t=x)=G(t=x)*Fr(t=x)+G(t=2\alpha-x)*Rr(t=2\alpha-x) \quad (4)$$

where, $x= \ldots, \alpha-2, \alpha-1, \alpha, \alpha+1, \alpha+2, \ldots$

Similarly, when mixing of the sound data output from the left front position and the left rear position is conducted, the following equation is obtained, assuming that the data output from the left front position is represented as F1(t), and the data output from the left rear position is represented as R1(t).

$$z(t=x)=G(t=x)*F1(t=x)+G(t=2\alpha-x)*R1(t=2\alpha-x) \quad (5)$$

where, $x= \ldots, \alpha-2, \alpha-1, \alpha, \alpha+1, \alpha+2, \ldots$

From the above equations (4) and (5), data obtained by mixing the front sound data and the rear sound data can be expressed as, $$z(t=x)=G(t=x)*F(t=x)+G(t=2\alpha-x)*Rr(t=2\alpha-x) \quad (6)$$

where, $x= \ldots, \alpha-2, \alpha-1, \alpha, \alpha+1, \alpha+2, \ldots$ and, where, F(t) is the sound data of the left and right positions, and R(t) is the data of the left and right positions after the phase transformation.

Finally, the front audio data F(t) and the phase transformed audio data at the rear positions R(t) are mixed by the first and second mixing circuits 21 and 22. The finally mixed data are expressed by the following equation.

$$z(t)+C(t) \quad (7)$$

The audio data C(t) are data which are as phase transformed without considering the space transmission characteristic.

Figure 3:
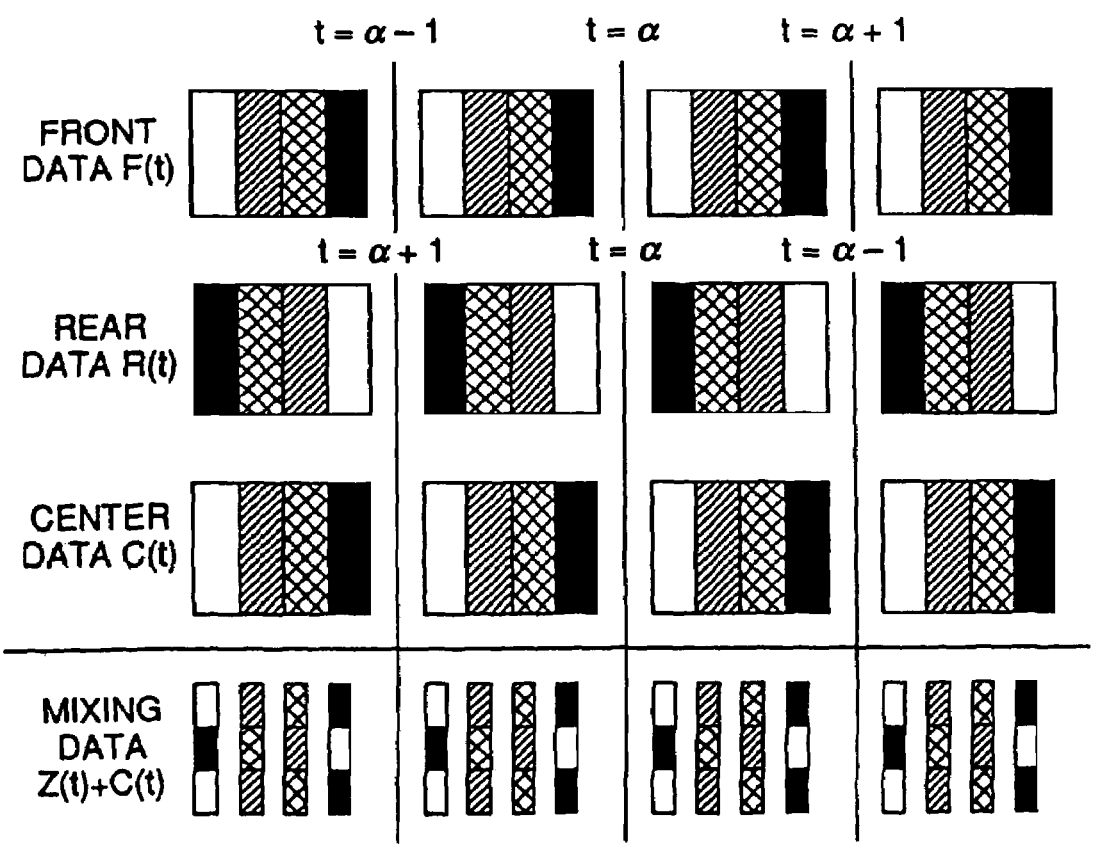
FIG. 3 shows images of audio data mixed by the first and second mixing circuits according to an embodiment of the present invention.

FIG. 3 illustrates images of the front data, the rear data, the center data, and the mixed sound data.

The left and right sound data after being mixed are, subsequently, converted into analog data by the first and second D/A converters 14 and 15, and are played back by the left and right speakers through the left and right output lines. The sound played back by the left and right speakers are the pseudo reproduction of the 5.1 channels. However, the playing back sound is very close to the stereo image of the surrounding sound reproduced by the 5.1 channels.

As hereinbefore described, an effect of the present invention is that it is capable of playing back with a surrounding effect which is not attainable by usual personal computer play-back systems, by outputting after mixing sound data of sound channels on one hand, which are subjected to the phase transformation, with sound data on the other hand, which are not phase transformed by respective left and right mixing circuits.

Another effect of the present invention is that it is capable of pseudo reproduction for playing back multi-channel surrounding sound by two speakers of personal computers and the sound effect of this sound is not obtainable by the usual sound play-back of computer computers.

The other effect of the present invention is that it is capable of giving audiences a deep spreading image after mixing the data for left and right front channels and the data for left and right rear channels while giving those data respective play-back sound fields and space transmitting characteristics which exhibits speaker characteristics.

Still an other effect of the present invention is that it is capable of increasing the surrounding effect during play-back by localizing audio signals of audio signals of the front center position to respective sounds and sound images of the left and right front positions and the left and right rear positions, respectively.

Still an other effect of the present invention is that it is capable of playing back with a bass sound effectively.

A further effect of the present invention is that it is capable of pseudo play-back of the 5.1 channels surrounding sound giving a higher surrounding effect which is not obtainable by the usual 2-channel audio play-back apparatus, by outputting after mixing, by two left and right mixing circuits, phase transformed sounds with non-phase transformed sounds.

What is claimed is:

1. A pseudo multi-channel play-back apparatus comprising:
    a memory for temporarily storing first and second digital audio signals:
    a phase control circuit for controlling a phase of said first digital audio signal;
    a mixing circuit for mixing said first digital audio signal transformed by said phase control circuit with said second digital audio signal that has not been input to said phase control circuit; and
    a D/A converter for converting an output of said mixing circuit into an analog sound signal.

2. A pseudo multi-channel play-back apparatus according to claim 1, wherein said first digital audio signal includes a digital audio signal for a first channel and a digital audio signal for a second channel, and
    wherein said second digital audio signal includes a digital audio signal for a third channel, and
    wherein said mixing circuit mixes digital audio signals for the first and second channels transformed by said phase control circuit and the digital audio signal for the third channel stored in said memory.

3. A pseudo multi-channel play-back apparatus according to claim 2, wherein said mixing circuit mixes the digital audio signal for the third channel and the digital audio signal for the first channel while giving respective digital audio signals a space transmission characteristic which represents a play-back sound field.

4. A pseudo multi-channel play-back apparatus according to claim 2, wherein said second digital audio signal further includes a digital audio signal for a fourth channel, and
    wherein said mixing circuit mixes digital audio signals for the first and second channels transformed by said phase control circuit and the digital audio signals for the third and fourth channels stored in said memory.

* * * * *